Dec. 15, 1959  R. B. MATTHEWS  2,917,239
MODULATING AND SAFETY SHUT-OFF FUEL CONTROL DEVICE
Filed Oct. 12, 1953  2 Sheets-Sheet 1

INVENTOR.
Russell B. Matthews
BY
Seegert & Schwalbach.
Att'ys

Dec. 15, 1959 R. B. MATTHEWS 2,917,239
MODULATING AND SAFETY SHUT-OFF FUEL CONTROL DEVICE
Filed Oct. 12, 1953 2 Sheets-Sheet 2
Fig. 3.
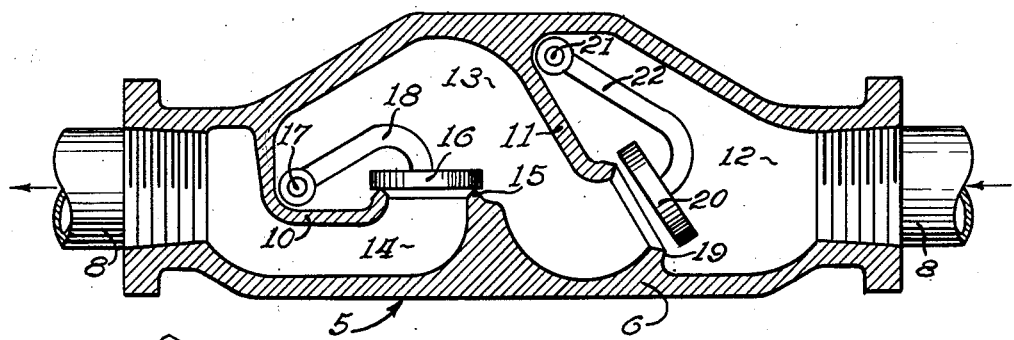
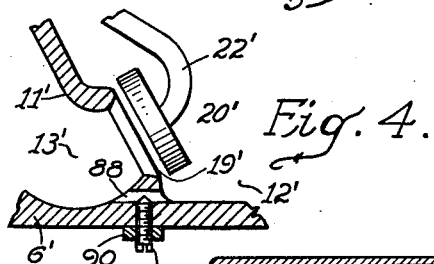
Fig. 4.
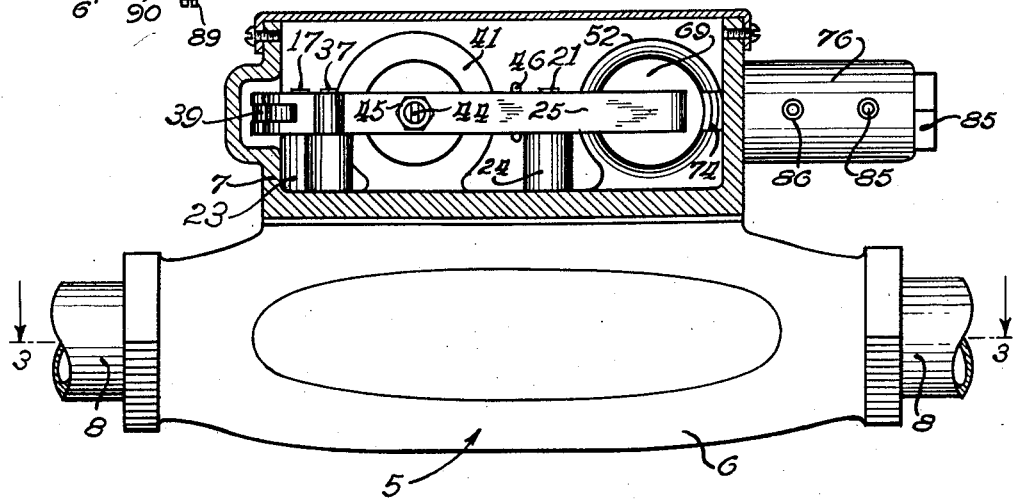
Fig. 2.
INVENTOR.
Russell B. Matthews
BY
Seegert & Schwalbach
Attys

United States Patent Office 2,917,239
Patented Dec. 15, 1959

2,917,239

MODULATING AND SAFETY SHUT-OFF FUEL CONTROL DEVICE

Russell B. Matthews, Wauwatosa, Wis., assignor to Baso Inc., Milwaukee, Wis., a corporation of Wisconsin Application October 12, 1953, Serial No. 385,407

13 Claims. (Cl. 236—1)

This invention relates to improvements in modulating fuel flow-controlling devices.

In the operation of fluid fuel burners there is a minimum amount of fuel required to maintain a stable flame, and in order to insure safe operation, it is important that the burner is not supplied with fuel in less than said minimum amount. To provide for safe ignition of the burner, however, it is necessary to provide fuel in amounts substantially greater than the aforementioned safe minimum.

It is a general object of the present invention to provide an improved modulating fuel control device in which the minimum fuel flow permitted thereby is substantially equal to the minimum amount required for maintenance of a stable flame at the burner.

Another object of the invention is to provide an improved modulating fuel control device of the aforementioned character which at the proper time supplies sufficient fuel to the burner for safe ignition of the latter.

Another object of the invention is to provide an improved fuel control device of the self-powered type, having a modulating valve and an on-off valve, there being condition responsive actuating means for modulating the modulating valve between a minimum safe flow-permitting position and a safe ignition position in response to normal fluctuations in the condition, said means being responsive to an extreme in the condition requiring lesser flow than said minimum amount to close the on-off valve and thereby stop all fuel flow to the burner.

A more specific object of the invention is to provide an improved modulating fuel control apparatus of the aforementioned character wherein the condition responsive actuating mechanism takes the form of a pair of fluid-filled bellows having means affording communication therebetween, one of said bellows actuating the modulating valve, and the other of said bellows actuating the on-off valve through a connection including snap-acting means having actuating force differential characteristics.

Another specific object of the invention is to provide an improved fuel control device of the class described wherein there is means for preventing further expansion of the modulating valve bellows after said bellows has positioned the modulating valve in its minimum safe flow-permitting position, so that continued expansion of the bellows fill causes actuation of the snap-acting means and closure of the on-off valve by said other bellows.

Another object of the invention is to provide an improved modulating fuel control apparatus which not only controls the flow of fuel to a main burner, but also controls the flow of fuel to a pilot burner, said apparatus providing interruption of the fuel flow to the main burner during ignition of the pilot burner, and providing 100 percent shut-off of the fuel on pilot burner outage.

Another object of the invention is to provide an improved modulating fuel control device which is relatively simple in construction and inexpensive to manufacture, and is otherwise well adapted for the purposes described.

Having in mind the aforementioned objects, and other objects which will become apparent as the description proceeds, the invention consists of the improved modulating fuel control device and all of its parts and combinations, as set forth in the claims, and all equivalents thereof.

In the accompanying drawings, illustrating one complete embodiment of the invention, and wherein like characters of reference indicate the same parts in all of the views:

Figure 2 is a side elevational view, partly in section, taken along the line 2—2 of Figure 1;

Figure 3 is a sectional plan view taken approximately along the line 3—3 of Figure 2; and Figure 4 is a fragmentary sectional plan view of a modified form of the invention.

Figure 1:
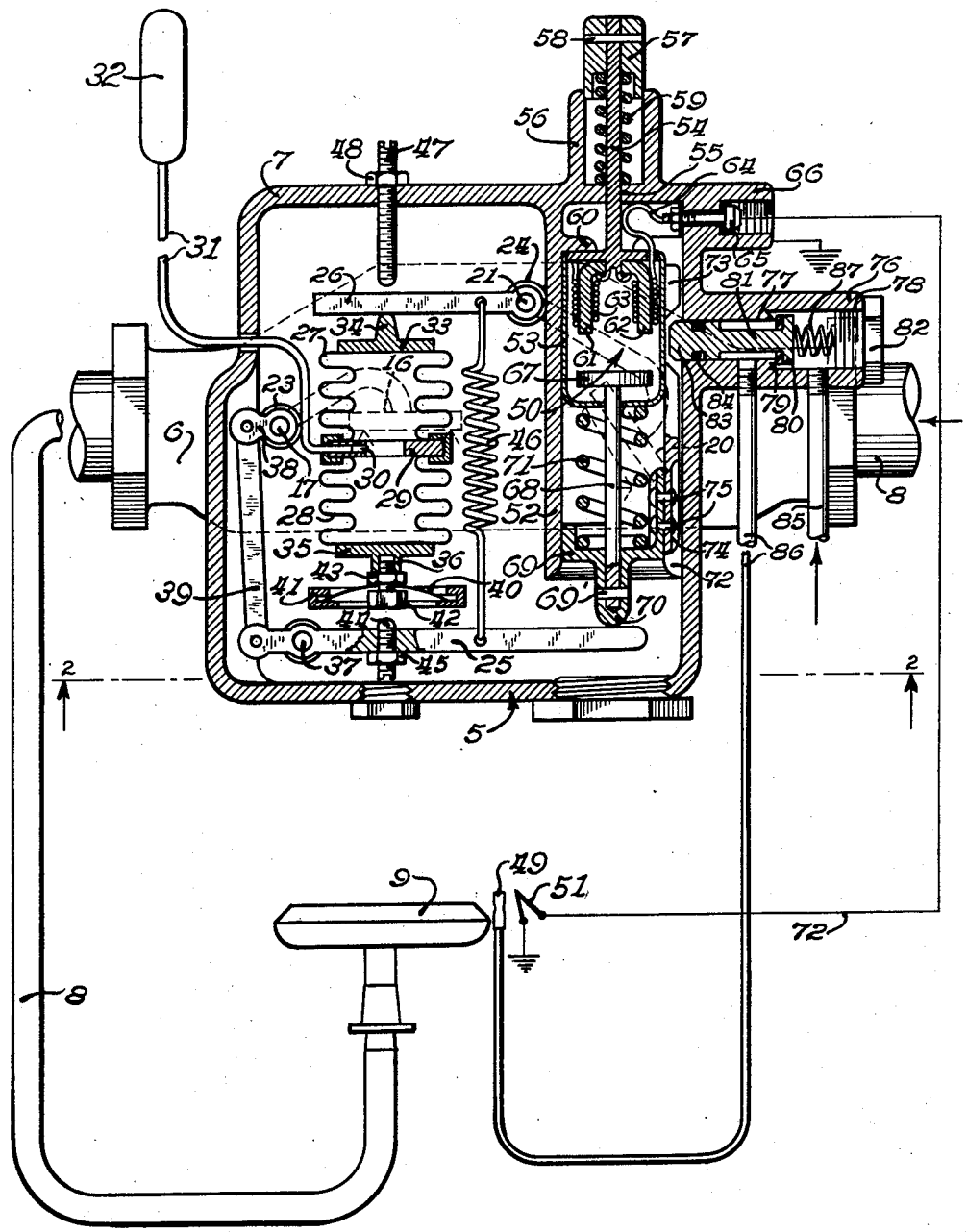
Figure 1 is a sectional plan view of the improved modulating fuel control device, with associated parts being shown semidiagrammatically.

Referring to the drawings, the improved modulating fuel control device is indicated generally by the numeral 5, and is shown most clearly in Figure 2, said device including a valve body 6 on which is mounted a control casing 7. The valve body 6 is interposed in the fuel supply line 8 to a main burner 9 (see Figure 1), and the device 5 controls the flow of fuel to said main burner.

The valve body 6 is formed with apertured transverse partitions 10 and 11 dividing said body into an inlet chamber 12, an intermediate chamber 13 and an outlet chamber 14. The partition 10 is provided with an annular valve seat 15, and within the chamber 13 an on-off valve member 16 is fixed to a pivot shaft 17 by an arm 18, for swinging movement into and out of sealing engagement with the seat 15. The pivot shaft 17 extends through a suitable bearing 23 (see Figure 1) into the control casing 7. The partition 11 of valve body 6 is provided with an annular valve seat 19, and within the chamber 12, a modulating valve member 20 is fixed to a pivot shaft 21 by an arm 22 and is swingable toward and away from the valve seat 19. The pivot shaft 21 extends through a suitable bearing 24 (see Figures 1 and 2) into the control chamber 7. Within the control casing 7 an arm 25 is pivotally mounted on a pivot shaft 37 and is linked to an arm 38 fixed to the pivot shaft 17 by means of a link 39. An arm 26 is fixed to the pivot shaft 21 within the casing 7.

Condition responsive means is provided for actuating the valve members 16 and 20, and in the illustrated embodiment said means includes a pair of bellows 27 and 28 positioned between the valve arms 25 and 26. The bellows 27 and 28 have a common apertured end wall 29 fixed within the casing 7, said end wall having a passage 30 affording communication between the interiors of said bellows and a tube 31 which connects with a temperature sensing bulb 32. The bellows 27 has an end wall 33 provided with a projection 34 positioned for engagement with the valve arm 26 as shown. A stop in the form of a set screw 47 is threaded through the casing 7 and is provided with a locknut 48, said stop being positioned to limit the swinging movement of the valve arm 26. When the arm 26 is in engagement with the set screw 47, the valve member 20 is in a position to permit the minimum amount of fuel flow which will maintain a stable flame at the burner 9.

The bellows 28 has an end wall 35 provided with an internally threaded socket 36, and a snap-acting force-transmitting connection is provided between said end wall and the valve arm 25, said connection including a snap-acting member 40 which may take the form of a centrally apertured snap disk, as shown. The disk 40 is mounted in an annular retaining ring 41 fixed within the casing 7, and a screw 42 projects loosely through the central aperture in said disk and is threaded into the socket 36. A locknut 43 is threaded on the screw 42, and the space between said locknut and the head of the screw 42 may be greater than the thickness of the disk 40 to provide a certain amount of lost motion. The mentioned spacing can be readily adjusted for a purpose to be hereinafter described. The valve arm 25 carries a set screw 44 which may be provided with a locknut 45, said set screw being engageable with the head of the screw 42. A tension spring 46 connects the valve arms 25 and 26, biasing the arm 26 toward the bellows end wall 33, and biasing the arm 25 toward the snap disk 40.

The bellows 28, bellows 27, tube 31 and bulb 32 contain a suitable temperature responsive expansible and contractible fluid fill. The snap disk preferably has differential characteristics and may be of the type which require a predetermined force to be exerted thereon in one direction to snap said disk to deformed position, and requires a predetermined force to be exerted thereon in the opposite direction to return said disk to its normal position shown.

The burner 9 is provided with a pilot burner 49 in coacting relationship therewith, and means are provided for shutting off the flow of fuel to the main burner during ignition of the pilot burner, as well as for providing 100 percent shut-off of the fuel on pilot burner outage. In the illustrated embodiment this means takes the form of an electromagnetic safety shut-off mechanism 50 powered by current from a thermoelectric generator 51, such as a thermocouple, mounted in a position to be subject to the heat of the flame of the pilot burner 49.

More specifically, the casing 7 is formed with a cylindrical sleeve 52 in which a hood or casing 53 is axially slidable. The casing 53 is provided with an axial stem 54 fixed thereto and slidably projecting through a suitable aperture 55 in the casing wall and axially through an external tubular socket 56 formed on said wall. A manually engageable reset button 57 is fixed to the outer end of the stem 54, as by a pin 58, said button being telescopically slidable within the socket 56. A coiled compression spring 59 surrounds the stem 54 within the socket 56, and through said button and the stem 54, biases the casing 53 axially into engagement with an abutment 60.

An electromagnet 61 is fixed within the casing 53 and comprises a U-shaped magnet frame 62 around the legs of which is wound a coil 63. One end of the coil 63 is grounded to the casing 53, and the other end of said coil is connected by a flexible lead 64 to an insulated terminal tip 65 which is exposed within an internally threaded socket 66 formed on the exterior of the casing 7. The terminal tip 65 is connected to one terminal of the generator 51 by means of a suitable conductor 72, the other terminal of said generator being grounded as shown. An armature 67 is positioned within the casing 53 for coaction with the electromagnet 61, said armature having a stem 68 fixed thereto and axially slidably projecting through the end wall of the casing 53. A cup-shaped member 69 is axially slidable within the sleeve 52 and is connected to the stem 68, as by a pin 69′, said member being provided with a projection 70 which is positioned for engagement with the valve arm 25. A coiled compression spring 71 surrounds the stem 68 between the casing 53 and the member 69, and biases the member 69 toward the valve arm 25, thereby also biasing the stem 68 and the armature 67 in said direction. The sleeve 52 is formed with an internal longitudinal groove 72, and positioned in said groove are cam members or bars 73 and 74. The cam 73 is fixed to the casing 53 and movable axially therewith, and the cam 74 is fixed to the member 69 as by rivets 75, and is axially movable with said member.

The casing 7 is formed with an external cylindrical projection 76 having an axial bore 77 and a counterbore 78 providing an annular valve seat 79. A valve member 80 within the counterbore 78 is biased toward the valve seat 79 by a coiled compression spring 87 which is interposed between said valve member and a plug 82 threaded into the outer end of said counterbore. The valve member 80 is provided with an integral stem 81 which connects said valve member with a cylindrical piston or guide 83 axially slidable in the bore 77 and provided with an external annular groove to receive a sealing ring 84. A fuel supply pipe 85 affords communication between the counterbore 78 and a source of fuel, and a fuel supply pipe 86 affords communication between the bore 77 and the pilot burner 49, so that the valve member 80 controls the flow of fuel to said pilot burner.

With the parts of the device disclosed as shown in the drawings, the on-off valve 16 is being held closed by the bias of the spring 71 of the safety shut-off mechanism 50, which mechanism is in released position. At the same time the pilot fuel valve 80 is held closed by the bias of the spring 87, and therefore all fuel flow is shut off. The modulating valve 20, however, is disposed in an open position wherein, if the valve 16 were open, sufficient fuel could flow to the burner 9 for safe ignition.

To set the improved device into operation, the reset button 57 is depressed against the bias of the springs 59 and 71 to set the electromagnet 61 to the armature 67. Simultaneously the cam 73 is moved under the guide 83 to move the latter and the pilot fuel valve 80 outwardly, opening said valve and permitting fuel flow to the pilot burner 49. The pilot burner is then ignited and begins heating the thermocouple 51, which energizes the electromagnet 61, so that upon release of the reset button 57, the armature 67 is held in contact with the pole faces of the electromagnet 61 against the bias of the spring 71. It will be noted that while the reset button 57 is depressed, the on-off valve 16 continues to be held closed to provide interruption of the flow of fuel to the main burner 9. On release of the reset button 57 the spring 59 returns said button, stem 54 and casing 53 to their normal positions shown. However, since the armature 67 is now held to the pole faces of the electromagnet 61, cam member 74 and the member 69 and its projection 70 are retracted within the sleeve 52 by return of the casing 53 to its normal position. Retraction of the cam member 74 moves the latter under the guide 83 to continue to hold the pilot fuel valve 80 open, and as the projection 70 is retracted, the bias of the spring 46 pivots the valve arm 25 in a counterclockwise direction and thereby moves the on-off valve 16 to open position. Fuel can now flow to the main burner 9 in sufficient quantity for safe ignition by the pilot burner 49.

As the temperature sensed by the bulb 32 increases, the fill within the bellows 27 and 28 expands, the end wall 33 and its projection 34 are moved outwardly to pivot the valve arm 26 in a clockwise direction, thereby moving the modulating valve member 20 in a flow-restricting direction. The modulating valve member 20 is then modulated by the bellows 27 between its ignition position and its minimum flow-permitting position in accordance with normal fluctuations in room temperature. When the temperature approaches the upper end of the predetermined modulating range, the valve arm 26 engages the stop 47 to thereby limit the closing movement of the modulating valve member 20 to that which will supply sufficient fuel to maintain a stable flame at the burner 9. Alternatively, the modulating valve member 20 could be allowed to seat on the seat 19 if a suitable by-pass were provided between the chambers 12 and 13 in a manner well known in the art. Figure 4 shows such a by-pass at 88 connecting chambers 12′ and 13′. Flow through the by-pass 88 can be adjusted by means of a screw 89 having a lock nut 90, said by-pass permitting sufficient fuel flow to the burner 9 to maintain a stable flame. With the alternative arrangement, the stop 47 can be omitted.

If the room temperature increases to above the modulating range, the fill continues to expand, and since the expansion of the bellows 27 is limited by the stop 47, the pressure generated by fill expansion causes the bellows 28 to expand and snap the snap disk 40 to deformed position (not shown). As the snap disk 40 snaps, the head of the screw 42 engages the set screw 44 on the valve arm 25 and pivots said arm in a clockwise direction against the bias of spring 46 to close the on-off valve 16. Fuel flow to the burner 9 is thereby shut off.

As the snap disk 40 is snapped to deformed position, it exerts a pull on the head of the screw 42. The snap disk 40 preferably has differential characteristics which require a substantial pull to be exerted thereon by the head of the screw 42 in order for said disk to snap back to its normal position. Therefore, as the room cools and the bellows fill contracts, the bellows 27 contracts before the bellows 28, to thereby move the modulating valve member 20 in an opening direction. By the time the modulating valve member 20 has been moved to the ignition position shown in response to fill contraction, the pressure within the bellows has decreased to the point where the screw 42 exerts sufficient pull on the disk 40 to snap the latter to its normal position shown. This permits the spring 46 to pivot the valve arm 25 in a counterclockwise direction to thereby open the on-off valve 16 and begin a new heating cycle.

The temperature differential of the bellows and snap disk assembly can be varied by adjusting the spacing between the head of the screw 42 and the locknut 43, so as to provide more or less lost-motion in the connection between the bellows end wall 35 and the snap disk 40.

In the event of extinguishment of the pilot burner 49, the generator 51 cools and deenergizes the electromagnet 61, whereupon the armature 67 is pulled away from the pole faces of the electromagnet 61 by the bias of the spring 71. The projection 70 is simultaneously moved into actuating engagement with the valve arm 25 to close the on-off valve 16 and shut off all fuel flow to the main burner 9. Release of the armature 67 also moves the cam 74 (which had previously moved under the guide 83 on release of the reset button 57) out from under the guide 83 to the position shown, thereby permitting the valve member 80 to close on the seat 79 under the bias of the spring 81. Closure of the valve 80 cuts off all fuel flow to the burner 49 and thereby provides 100 percent shut-off of the fuel.

The forms of the invention specifically illustrated, and the corresponding description are used for the purpose of disclosure only, and are not intended to impose unnecessary limitations on the claims, or to confine the invention to a particular use. Various changes and modifications may be made without departing from the spirit of the invention, and all of such changes are contemplated as may come within the scope of the claims.

What is claimed as the invention is:

1. Fuel flow-controlling device, comprising: A modulating valve member movable between a minimum flow-permitting position and an increased flow-permitting ignition position; a second valve member movable between open and closed positions; condition responsive actuating mechanism for said valve including first and second fluid filled expansible and contractible bellows having a fixed common end wall, said bellows being fluidly connected and each having a movable end wall; means connecting the end wall of said first bellows to said modulating valve member; means limiting the expansible movement of said first bellows to that which positions the modulating valve member in said minimum flow-permitting position; and means including a snap-acting member connecting said second bellows to said second valve member whereby said snap-acting member is snapped to deformed condition and said second valve member is moved to closed position in response to expansion of the fill after said first bellows has expanded to its limit, said snap-acting member having differential characteristics whereby on subsequent contraction of the fill, said first bellows contracts to move the modulating valve member to said ignition position before said second bellows contracts sufficiently to snap the snap-acting member back to its normal position and thereby move the second valve member to open position.

2. A fuel flow-controlling device, comprising, a first flow-controlling member movable between a minimum flow-permitting position and an increased flow-permitting position, a second flow-controlling member movable between a flow-preventing position and a flow-permitting position, condition responsive actuating mechanism for said flow-controlling members including first and second expansible and contractible enclosures, said enclosures having a fixed common end wall, means affording communication between said enclosures, an expansible and contractible fluid fill for said enclosures, said first enclosure having a movable end wall responsive to expansion and contraction of said fill to effect movement of said first flow-controlling member toward its minimum and increased flow-permitting positions respectively, said second enclosure also having a movable end wall responsive to expansion and contraction of said fill to effect movement of said second flow-controlling member toward its flow-preventing and flow-permitting positions respectively, means limiting the expansible movement of said first enclosure movable end wall to that which positions said first flow-controlling member in said minimum flow-permitting position, and means biasing said second flow-controlling member toward flow-permitting position whereby said second flow-controlling member moves to flow-preventing position in response to expansion of the fill only after said first enclosure has expanded to its limit.

3. A fuel flow-controlling device, comprising a first flow-controlling member movable between a minimum flow-permitting position and an increased flow-permitting ignition position; a second flow-controlling member movable between flow-permitting and flow-preventing positions; and condition responsive mechanism having connections with both of said flow-controlling members to modulate said first flow-controlling member between said minimum flow-permitting position and said ignition position in response to normal fluctuations in the condition, the connection of said mechanism with said second flow-controlling member including snap-acting means having a stable first position and a stable over-center position, said condition responsive mechanism being responsive to an extreme condition requiring lesser fuel flow than said minimum to snap said snap-acting means to said over-center position and thereby move the second flow-controlling member to flow-preventing position, the stability of said snap-acting means in its said over-center position imparting differential characteristics thereto, whereby upon moderation of the condition said first flow-controlling member is moved by said mechanism to said ignition position before said snap-acting means is returned to its said first position and said second flow-controlling member is thereby moved to flow-permitting position in response to said condition moderation.

4. A fuel flow-controlling device, comprising: A first flow-controlling member movable between a minimum flow-permitting position and an increased flow-permitting ignition position; a second flow-controlling member movable between flow-permitting and flow-preventing positions; condition responsive mechanism having connections with both of said flow-controlling members to modulate said first flow-controlling member between said minimum flow-permitting position and said ignition position in response to normal fluctuations in the condition, the connection of said mechanism with said second flow-controlling member including snap-acting means having a stable first position and a stable over-center position, said condition responsive mechanism being responsive to an extreme condition requiring lesser fuel flow than said minimum to snap said snap-acting means to said over-center position and thereby move the second flow-controlling member to flow-preventing position, the stability of said snap-acting means in its said over-center position imparting differential characteristics thereto, whereby upon moderation of the condition said first flow-controlling member is moved by said mechanism to said ignition position before said snap-acting means is returned to its said first position and said second flow-controlling member is thereby moved to flow-permitting position in response to said condition moderation; and safety shut-off means responsive to a third condition and positioned to move said second flow-controlling member to flow-preventing position unless said third condition is satisfied.

5. A fuel flow-controlling device, comprising: A first flow-controlling member movable between a minimum flow-permitting position and an increased flow-permitting ignition position; a second flow-controlling member movable between flow-permitting and flow-preventing positions; condition responsive mechanism having connections with both of said flow-controlling members to modulate said first flow-controlling member between said minimum flow-permitting position and said ignition position in response to normal fluctuations in the condition, the connection of said mechanism with said second flow-controlling member including snap-acting means having a stable first position and a stable over-center position, said condition responsive mechanism being responsive to an extreme condition requiring lesser fuel flow than said minimum to snap said snap-acting means to said over-center position and thereby move the second flow-controlling member to flow-preventing position, the stability of said snap-acting means in its said over-center position imparting differential characteristics thereto, whereby upon moderation of the condition said first flow-controlling member is moved by said mechanism to said ignition position before said snap-acting means is returned to its said first position and said second flow-controlling member is thereby moved to flow-permitting position in response to said condition moderation; fuel ignition means; a thermo-electric generator subject to the heat of said ignition means; and safety shut-off means powered by current from said generator and positioned to move said second flow-controlling member to flow-preventing position on outage of said ignition means.

6. A fuel flow-controlling device, comprising: A first flow-controlling member movable between a minimum flow-permitting position and an increased flow-permitting ignition position; a second flow-controlling member movable between flow-permitting and flow-preventing positions; condition responsive mechanism having connections with both of said flow-controlling members to modulate said first flow-controlling member between said minimum flow-permitting position and said ignition position in response to normal fluctuations in the condition, the connection of said mechanism with said second flow-controlling member including snap-acting means having a stable first position and a stable over-center position, said condition responsive mechanism being responsive to an extreme condition requiring lesser fuel flow than said minimum to snap said snap-acting means to said over-center position and thereby move the second flow-controlling member to flow-preventing position, the stability of said snap-acting means in its said over-center position imparting differential characteristics thereto, whereby upon moderation of the condition said first flow-controlling member is moved by said mechanism to said ignition position before said snap-acting means is returned to its said first position and said second flow-controlling member is thereby moved to flow-permitting position in response to said condition moderation; and means for selectively varying the differential of said snap-acting means.

7. A fuel flow-controlling device, comprising: A first flow-controlling member movable between a minimum flow-permitting position and an increased flow-permitting position; a second flow-controlling member movable between a flow-permitting position and a flow-preventing position; condition responsive actuating mechanism including a first and a second fluid filled expansible and contractible bellows, there being means affording communication between said bellows; means connecting said first bellows to said first flow-controlling member; means limiting expansion of said first bellows to that which positions the first flow-controlling member in said minimum flow-permitting position; and means including snap-acting means movable between a stable first position and a stable over-center second position and connecting said second bellows to said second flow-controlling member, the stability of said snap-acting means in its first position preventing snapping of said snap-acting means to its second position and movement of said second flow-controlling member to flow-preventing position in response to expansion of the fill until after said first bellows has expanded to its limit, the stability of said snap-acting means in its over-center second position imparting differential characteristics thereto, whereby on subsequent contraction of the fill, said first bellows contracts to position said first flow-controlling member in said increased flow-permitting position before said second bellows contracts sufficiently to snap the snap-acting means to its said first position and thereby move the second flow-controlling member to flow-permitting position.

8. A fuel flow-controlling device, comprising: A first flow-controlling member movable between a minimum flow-permitting position and an increased flow-permitting ignition position; a second flow-controlling member movable between flow-permitting and flow-preventing positions; condition responsive mechanism including a first expansible and contractible enclosure having a fluid fill and having connections with said first flow-controlling member for modulating the latter between said minimum flow-permitting position and said ignition position in response to normal fluctuations in the condition, said mechanism including a second expansible and contractible enclosure having a fluid fill and being in communication with said first enclosure, there being connections between said second enclosure and said second flow-controlling member including snap-acting means movable between a stable first position and a stable over-center second position; and means limiting the expansion of said first enclosure to that which positions said first flow-controlling member in said minimum flow-permitting position, the stability of said snap-acting means in its first position preventing snapping thereof to its second position by the forces generated by said fill in response to normal fluctuations in the condition, expansion of the fill in response to an extreme condition expanding said second enclosure to cause snap actuation of said snap-acting means to its second position and movement of the second flow-controlling member to flow-preventing position, the stability of said snap-acting means in its second position imparting differential characteristics thereto, whereby upon moderation of the condition said first enclosure contracts to move said first flow-controlling member to said ignition position before said second enclosure contracts to return said snap-acting means to its first position and thereby move said second flow-controlling member to flow-permitting position.

9. A fuel flow-controlling device, comprising: A first flow-controlling member movable between a minimum flow-permitting position and an increased flow-permitting ignition position; a second flow-controlling member movable between flow-permitting and flow-preventing positions; condition responsive mechanism including a first expansible and contractible enclosure having a fluid fill and having connections with said first flow-controlling member for modulating the latter between said minimum flow-permitting position and said ignition position in response to normal fluctuations in the condition, said mechanism including a second expansible and contractible enclosure having a fluid fill and being in communication with said first enclosure, there being connections between said second enclosure and said second flow-controlling member including a snap-acting member movable between a stable first position and a stable over-center second position; means limiting the expansion of said first enclosure to that which positions said first flow-controlling member in said minimum flow-permititng position, the stability of said snap-acting member in its first position preventing snapping thereof to its second position by forces generated by said fill in response to normal fluctuations in the condition, expansion of the fill in response to an extreme condition expanding said second enclosure to cause snap actuation of said snap-acting member over-center to its second position and movement of the second flow-controlling member to flow-preventing position, the stability of said snap-acting member in its second position imparting differential characteristics thereto, whereby upon moderation of the condition said first enclosure contracts to move said first flow-controlling member to said ignition position before said second enclosure contracts to return said snap-acting member to its first position and thereby move said second flow-controlling member to flow-permitting position; and means in said connection to the snap-acting member for permitting an adjustable amount of lost-motion to thereby provide a differential adjustment.

10. A controlling device, comprising, a first control member movable between a first position and a second position, a second control member movable between a first position and a second position, condition responsive actuating mechanism for said control members including expansible and contractible enclosure means containing a fluid fill for actuation of said first and second control members, and means affording an operative connection between said enclosure means and said control members, the connection to said second control member including snap-acting means having stable opposite over-center positions, the stability of said snap-acting means in one of its stable positions restraining movement of said second control member from its first toward its second position in response to expansion of said enclosure means until said expansion has moved said first control member from its first to its second position, continued expansion of said enclosure means while said first control member is in its second position being operable to snap said snap-acting means over-center to its other stable position and thereby move said second control member from its first to its second position, the stability of said snap-acting means in its said other stable position restraining movement of said second control member from its second toward its first position in response to contraction of said enclosure means until said first control member has been moved to its first position in response to said contraction.

11. A controlling device, comprising, a first control member movable between a first position and a second position, a second control member movable between a first position and a second position, condition responsive actuating mechanism for said control members including expansible and contractible enclosure means containing a condition responsive fluid fill and having first and second movable wall portions for cooperation with said first and second control members respectively, and an operative connection between said second wall portion and said second control member including snap-acting means having stable opposite over-center positions, the stability of said snap-acting means in each of said stable positions resisting movement of said second control member, whereby expansion of said fill in response to a predetermined first condition effects movement of said first movable wall portion and thereby said first control member from its first position to its second position followed by movement of said second movable wall portion and snapping of said snap-acting means over-center from one to another of its stable positions to thereby move said second control member from its first position to its second position, whereas contraction of said fill in response to a second predetermined condition and while said control members are in their second positions effects reverse movement of said first movable wall portion and thereby return of said first control member to its first position followed by reverse movement of said second movable wall portion and snapping of said snap-acting means from its said other to its said one position to return said second control member to its first position.

12. A controlling device, comprising, a first control member movable between a first position and a second position, a second control member movable between a first position and a second position, condition responsive actuating mechanism for said control members including a first expansible and contractible enclosure having a fluid fill, expansion of said first enclosure moving said first control member from its first position to its second position, said actuating mechanism also including a second expansible and contractible enclosure having fluid fill, expansion of said second enclosure moving said second control member from its first position to its second position, and means including snap-acting mechanism having stable opposite over-center positions operatively related to said first and second enclosures, the stability of said snap-acting mechanism in one of said stable positions requiring expansion of said first enclosure to a point where said first control member is in its second position before said second enclosure is permitted to expand and snap said snap-acting mechanism over-center to its other stable position for movement of said second control member to its second position, the stability of said snap-acting means in its said other stable position preventing return thereof to its said one stable position and return of said second control member to its first position by contraction of said second enclosure until after said first control member has been returned to its first position by contraction of said first enclosure.

13. In a valve structure, means defining a chamber having an inlet and an outlet, a pair of valves arranged in series in said chamber so that fluid must pass through both of the valves from said inlet to said outlet, means defining a restricted bypass around one of said valves through which fluid can pass when said one valve is closed and the other valve is open, condition responsive actuating means having operative connection with both of said valves, the connection to said other valve including snap-acting means having stable opposite over-center positions, the stability of said snap-acting means in each of its said opposite positions resisting movement of said other valve by said actuating means such that when the condition varies in a given sense, said one valve is closed before said other valve is closed, and when the condition varies in the opposite sense said one valve opens before said other valve.

References Cited in the file of this patent

UNITED STATES PATENTS

| | | |
|---|---|---|
| 510,017 | Gassett | Dec. 5, 1893 |
| 1,185,347 | Roller | May 30, 1916 |
| 1,684,530 | Bast | Sept. 18, 1928 |
| 2,040,762 | Spencer | May 12, 1936 |
| 2,085,300 | Dillman | June 29, 1937 |
| 2,102,656 | Vaughn | Dec. 21, 1937 |
| 2,214,558 | Kronmiller | Sept. 10, 1940 |
| 2,253,866 | Quoos | Aug. 26, 1941 |
| 2,312,479 | Ray | Mar. 2, 1943 |
| 2,361,945 | Jackson | Nov. 7, 1944 |
| 2,724,409 | Coffey | Nov. 22, 1955 |